US006813192B2

(12) United States Patent
Hwang et al.

(10) Patent No.: US 6,813,192 B2
(45) Date of Patent: Nov. 2, 2004

(54) APPARATUS AND METHOD FOR READING THE DEFAULT VALUE OF A PERIPHERAL COMPONENT

(75) Inventors: Bar-Chung Hwang, Taoyuan (TW); Iun-Bohr Rong, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 711 days.

(21) Appl. No.: 09/861,931

(22) Filed: May 21, 2001

(65) Prior Publication Data

US 2002/0056051 A1 May 9, 2002

(30) Foreign Application Priority Data

Sep. 20, 2000 (TW) .......................................... 89119344A

(51) Int. Cl.[7] .............................................. G11C 16/04
(52) U.S. Cl. .............................. 365/189.05; 365/189.11; 365/148
(58) Field of Search ........................ 365/189.05, 189.11, 365/148, 230.08, 154

(56) References Cited

U.S. PATENT DOCUMENTS 5,956,274 A  *  9/1999  Elliott et al. ........... 365/189.04

* cited by examiner

Primary Examiner—David Lam
(74) Attorney, Agent, or Firm—Ladas & Parry

(57) ABSTRACT

The present invention proposes an apparatus and method for reading the default value of a peripheral component to resolve the drawbacks of in expansibility, inconvenience in installation and higher manufacturing cost in the prior art. In order to accomplish the objective, the default value of the peripheral component is set up by a circuit board where the peripheral component situated, or stored inside a memory means in the present invention. When the system starts, the peripheral component reads the setup of the circuit board first. If there is no default value set up by the circuit board, the memory will be read. Next, the peripheral component will be set up according to the default value. Finally, the memory will be disabled to save power consumption.

14 Claims, 4 Drawing Sheets

APPARATUS AND METHOD FOR READING THE DEFAULT VALUE OF A PERIPHERAL COMPONENT

BACKGROUND OF THE INVENTION

1. Field of the Invention

The present invention relates to an apparatus and method for reading the default value of a peripheral component, especially to an apparatus and method for reading the default value of a peripheral component which is set up by the circuit board where the peripheral component is situated, or stored in a memory.

2. Description of Related Art

In the industry nowadays, every peripheral component, including a USB (Universal Series Bus) devices, have their own specific default values, such as a vender ID, product ID, product version or specification, such as the parameter of an operation current. Since a product line expansion is always ongoing, the use of default values will not be enough to represent the identifications of the products. One of the solutions for this problem is to define the default value using logic hard-wired configuration inside the peripheral component. For example, using four bits to define 16 kinds of the product identification. The disadvantage of the above method is that the number of the default value is not easily expandable. Another solution is to install a ROM inside the peripheral memory, and mark the product identification inside the ROM. The disadvantage of this is that it complicates the process of IC manufacturing and costs a lot of money. The other solution is to install a flash memory inside the peripheral component, and a system designer to write the default value to the flash memory through the software driver of the host. The disadvantage of this method is that it is inconvenient to install, and manufacturing cost will increase when the flash memory is installed inside the peripheral component.

From the description mentioned above, the apparatus for reading the default value of a peripheral component does not satisfy current market needs.

SUMMARY OF THE INVENTION

Accordingly, the object of the present invention is to resolve the drawbacks of in expansibility, inconvenience in installation and higher manufacturing cost in the prior art. In order to accomplish the objective, the present invention proposes an apparatus and method for reading the default value of a peripheral component. The default value of the peripheral component is set up by the circuit board where the peripheral component is situated, or stored inside a memory means. When the system starts, the peripheral component first reads the setup of the circuit board. If there is no default value in the circuit board, the memory will be read. The setup method of the circuit board is to connect a plurality of I/O signal lines of the peripheral component to a power end or ground end on the circuit board, and the plurality of I/O signal lines are connected to a voltage-controllable end through a plurality of pull resistors.

When a suspend signal is enabled and the way to setup the default value of the peripheral component in the circuit board is by way of connecting the plurality of I/O signal lines to the power end of the circuit board, the voltage-controllable end will be turned to logic one to save power consumption. When a suspend signal is enabled and the way to setup the default value of the peripheral component in the circuit board is by way of connecting the plurality of I/O signal lines to the ground end of the circuit board, the voltage-controllable end will be turned to logic zero to save power consumption.

When a suspend signal is enabled and the way to setup the default value of the peripheral component is determined by the content of the memory, the voltage-controllable end will be turned to logic zero to disable the memory to save power consumption.

Besides, if the default value of the peripheral component is determined by connecting to power end or ground end on the circuit board, the memory could be omitted to save money.

The apparatus of the present invention mainly comprises a plurality of bidirectional buffers, a register, a combinational logic, a control unit and a plurality of pull resistors. The plurality of bidirectional buffers have an ability to determine the direction of data transmissions. The initial ends of the bidirectional buffers are connected to said peripheral component, and the other ends of the bidirectional buffers are connected to the memory or the power or ground end on the circuit board. The combinational logic is connected to the initial end of the bidirectional buffers for determining if the default value of the peripheral component is set up by the circuit board. The register is used to store the output of the combinational logic. The control unit is connected to the output of the register and reset signal, and a suspend signal on said circuit board is used to generate a pull driving signal and a control signal to determine the direction of data transmissions of said bidirectional buffers. The plurality of pull resistors have an initial end and another end, the first end of the pull resistors is connected to the second end of the bidirectional buffers, and the second end of the pull resistors is connected to the pull driving signal of the control unit.

The method of the present invention mainly comprises the following steps. First, after a reset signal is enabled, the plurality of I/O signals are read and analyzed. If the plurality of I/O signals of the peripheral component are connected to a plurality of pull resistors with the state of pulling down and the values of the plurality of I/O signals are all logic zero, or the plurality of I/O signals of the peripheral component are connected to a plurality of pull resistors with the state of pulling up and the values of the plurality of I/O signals are all logic one, it represents the circuit board has not set up the default value of the peripheral component. On the contrary, if the condition is satisfied, it represents the circuit board has set up the default value of the peripheral component. Next, if the circuit board does not set up the default value of the peripheral component, the default value of the peripheral component stored in said memory is read, and the peripheral component is set up according to the default value. If the circuit board has set up the default value of the peripheral component, the peripheral component is set up according to the values read from the I/O signals. After the peripheral component is set up, the memory will be disabled to obtain the power-saving effect.

BRIEF DESCRIPTION OF THE DRAWINGS

The present invention will be described according to the appended drawings in which.

PREFERRED EMBODIMENT OF THE PRESENT INVENTION

Figure 1:
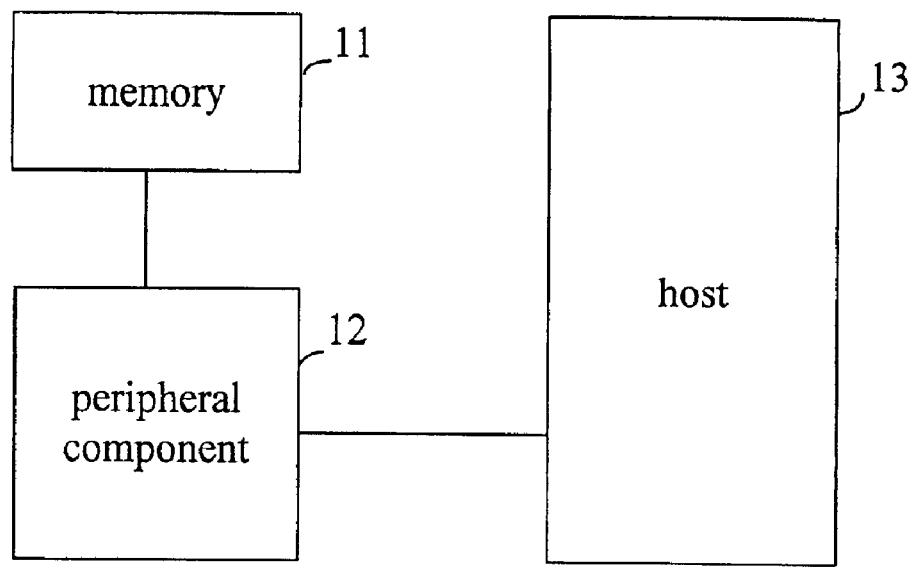
FIG. 1 is a structure diagram of hardware components of the present invention.

FIG. 1 is a structure diagram of hardware components of the present invention, comprising a memory 11, a peripheral component 12 and a host 13. The default value of the peripheral component 12 is set up by the circuit board (not shown) where the peripheral component 12 and memory 11 situate, or is stored in the memory 11. The way that the circuit board sets up the default value is to connect a power end or ground end on the circuit board to a plurality of I/O signals, which are connected to a voltage-controllable point through a plurality of pull resistors 32 (signal line pull$_{13}$ drv shown in FIG. 3 and FIG. 4). The host 13 can read the default value of the peripheral component 12. The memory 11 could be any kind of a non-volatile memory in the market, such as a mask ROM, a flash memory or an EEPROM. The memory 11 can be embedded inside the peripheral component 12, and the present invention does not limit it.

Figure 2:
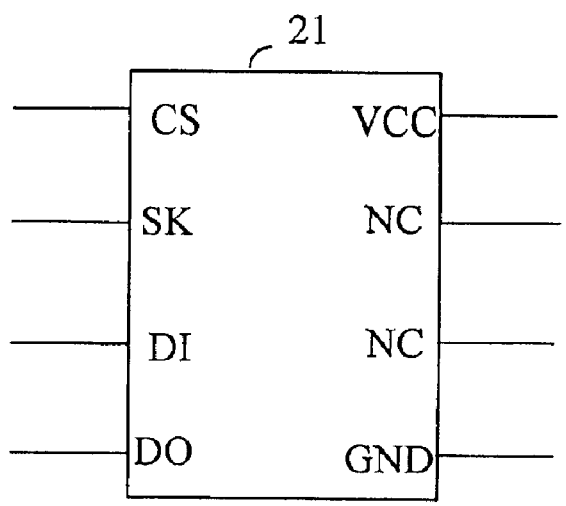
FIG. 2 is a pin diagram of prior serial access memory.

For reducing the cost, the memory 11 could be selected as a serial memory 21. FIG. 2 is a pin diagram of prior serial memory. The plurality of pins of the serial memory 21 comprises a CS (Chip Selection), SK (Serial Clock), DI (Data Input), DO (Data Output), a VCC (power end) and a GND (Ground end). When the CS pin is enabled, the memory 21 is in the active state. The SK pin is used to synchronize the actions inside the memory 21. The DI pin is used to input the serial address and data of the memory 21. The DO pin is used to output the serial data of the memory 21.

Figure 3:
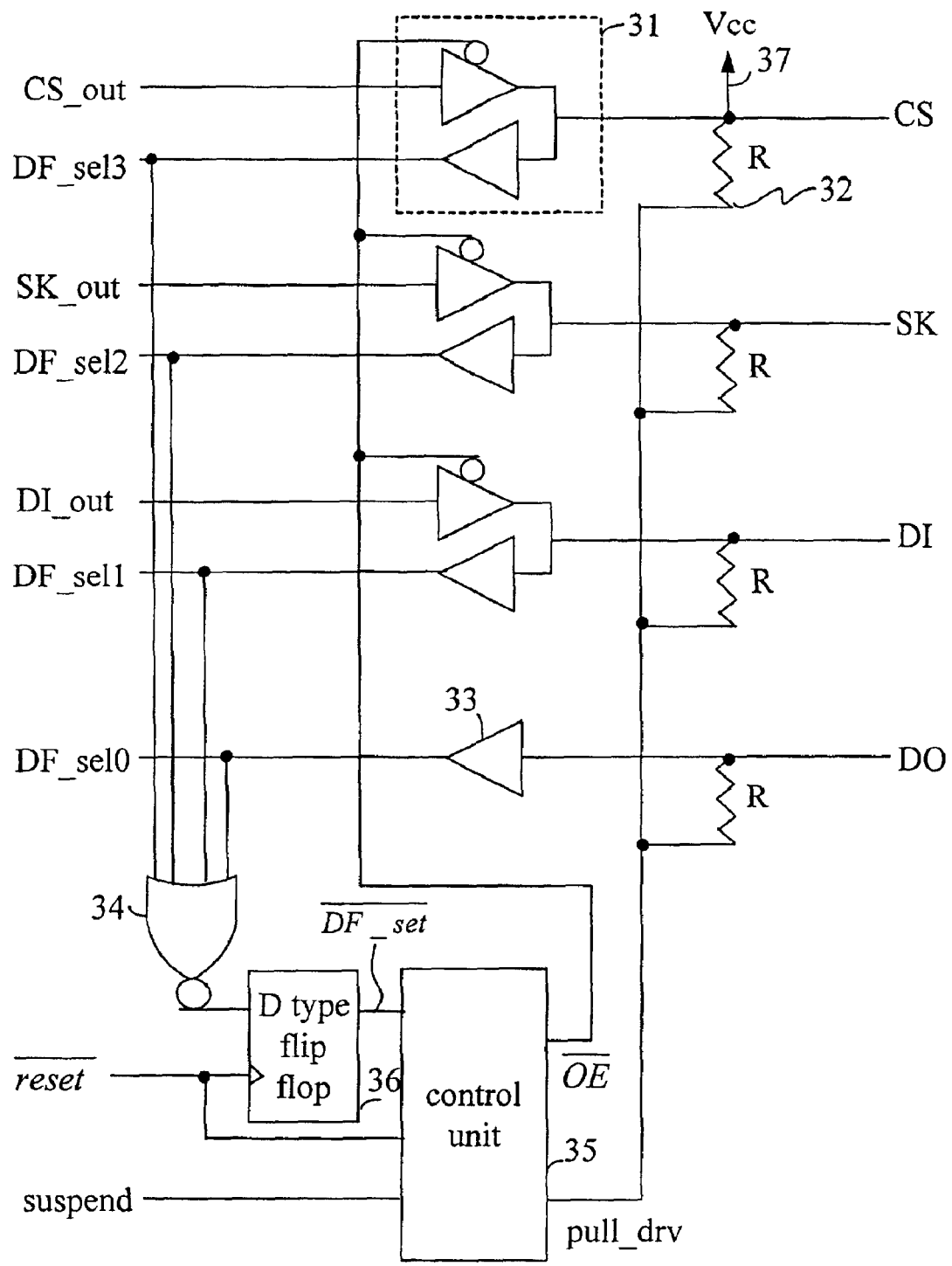
FIG. 3 is a circuit diagram according to a first preferred embodiment of the present invention.

FIG. 3 is a circuit diagram according to a first preferred embodiment of the present invention, wherein the circuit is placed inside the peripheral component 12 and connected to the serial memory 21 through signals CS, SK, DI and DO. The signals CS, SK, DI and DO are called peripheral signals. A signal suspend is used to detect if the peripheral component is in a power-saving mode. In the power-saving mode, the peripheral component 12 has to disable the memory 21, and forces the memory 21 into a standby state. A plurality of pull resistors R are connected to the peripheral signals. If a power end 37 on the circuit board is connected to peripheral signals, the pull resistors will act as a pull-down conductive path. The resistance of the plurality of resistors is usually about thousands of Ohms, and does not affect the actions that the peripheral component 12 reads the default value in the memory 11. When the system reset, such as power on reset, hardware reset or the peripheral component reset itself, the circuit of FIG. 3 determines that the default value of the peripheral component 12 is set up by the circuit board or stored in the memory 21. As mentioned above, the default value could be determined by connecting the peripheral signals to a power end 37 on the circuit board. For example, the CS signal in FIG. 3 is connected to a power end, it means that the default value of the peripheral component 12 is a binary number 1000, or a decimal number 8. If any of the peripheral signals is connected to the power end on the circuit board, the peripheral component 12 selects one of the default values according to the signal connection. If none of the peripheral signals is connected to the power end on the circuit board, the peripheral component 12 reads the default value from the memory 11 and then delivers to the host 13. Table 1 and Table 2 are truth tables of the control unit 35 in FIG. 3. Table 1 is a truth table if the default value of the peripheral component 12 is stored in the memory 21. Table 2 is a truth table if the default value of the peripheral component 12 is set up by the circuit board.

TABLE 1

|  | reset | $\overline{DF\_set}$ | suspend | $\overline{OE}$ | pull_drv |
|---|---|---|---|---|---|
| Step 1 | 0 | X | X | 1 | 0 |
| Step 2 | 1 | 1 | 0 | 0 | X |
| Step 3 | 1 | 1 | 1 | 1 | 0 |

TABLE 2

|  | reset | $\overline{DF\_set}$ | suspend | $\overline{OE}$ | pull_drv |
|---|---|---|---|---|---|
| Step 1 | 0 | X | X | 1 | 0 |
| Step 4 | 1 | 0 | X | 1 | 1 |

On the question of convenience, when a signal is passed from the right-hand toward the left-hand in FIG. 3, such as a signal from CS signal line transmitting to DF_se10 signal line, it is called "input mode"; when a signal is passed from CS_out signal line transmitting to CS signal line, it is called "output mode". The symbol "0" in Table 1 and Table 2 represents logic zero (0), meaning the voltage of the ground end. The symbol "1" in Table 1 and Table 2 represents logic one (1), meaning the voltage of the power end. The symbol "X" in Table 1 and Table 2 represents don't care. In step 1 of Table 1 and Table 2, after the system resets, a reset signal reset whose value is logic zero (0) is enabled. By the transformation of the control unit 35, the signal $\overline{OE}$ will be logic one (1). Since the signal $\overline{OE}$ is connected to the output-enabled end of three tri-state buffers, the circuit will be in an input mode when the system is reset. In the input mode, the peripheral signal will be connected to a NOR gate 34 through three bidirectional buffer 31 and a unidirectional buffer 33. As mentioned above, if the peripheral component has no default value which is set up by the circuit board, the output of the NOR gate 34 will be logic one (1). Otherwise, if the peripheral component has a default value which is set up by the circuit board, the output of the NOR gate 34 will be logic zero (0). The output of the NOR gate is connected to a register, such as a D type flip flop 36, and the output of the register is represented as $\overline{DF\_set}$. If $\overline{DF\_set}$ is logic one (1), representing the peripheral component does not have a default value, that means the peripheral component 12 will read the default value from memory 11, as Table 1 shown. If $\overline{DF\_set}$ is logic zero (0), this represents the peripheral component has a default value, as shown in Table 2. In step 2 of Table 1, when the circuit detects the signal $\overline{DF\_set}$ being logic one (1), that means all peripheral signals are logic zero (0), signal $\overline{OE}$ will be set to logic zero (0), meaning the bidirectional transmission is admitted after the reset signal is disabled. By the characteristic of the bidirectional transmission, the peripheral component 12 will generate the corresponding address and control signals to complete the actions of reading the default value in the memory 11. In step 3, when an input signal suspend is logic one (1), representing the peripheral component 12 will go into a power-saving mode. After entering the power-saving mode, the peripheral component 12 must keep in the state of low current leakage. For the present invention, after the default value stored in memory 21 is read, the power-saving mode must reduce the power consumption of the memory 21, that is to disable the memory 11. In the power-saving mode of step 3, signal $\overline{OE}$ is turned to logic one that forces the peripheral component 12 into an input mode, and the pull driving signal pull_drv is turned to logic zero (0) that disables the action of the memory 11.

In step 4 of the Table 2, when the circuit detects signal $\overline{DF\_set}$ being logic zero (0), meaning at least one peripheral signals is logic one (1), then the signal $\overline{OE}$ is set to logic one (1), and unidirection is only permitted. By the characteristic of unidirectional transmission, the peripheral component 12 can complete the action of reading the default value. In step 4, signal pull$_{13}$ rv is turned to logic one simultaneously, and avoids current flowing through the pull resistors 32 whose one end is connected to the power end 37 on the circuit board, and power consumption is therefore saved. In other words, step 4 is a power-saving mode.

Figure 4:
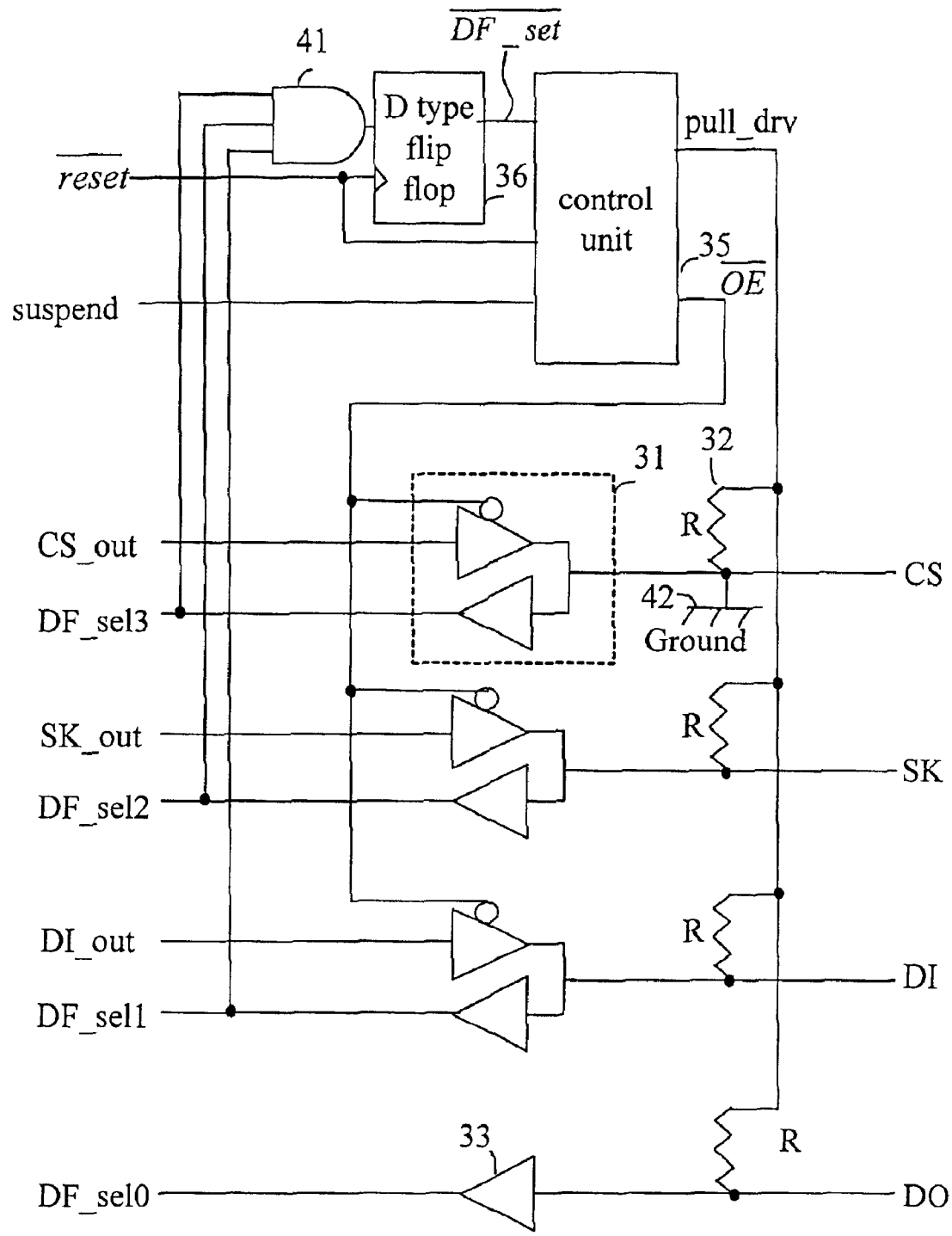
FIG. 4 is a circuit diagram according to a second preferred embodiment of the present invention.

FIG. 4 is a circuit diagram according to a second preferred embodiment of the present invention. The most significant difference between the structure of FIG. 3 and FIG. 4 is that the pull resistors 32 in FIG. 3 is pulled down, and therefore the default value is obtained by connecting to a power end on the circuit board. The pull resistors 32 in FIG. 4 are pulled up, and therefore the default value is obtained by connecting to a ground end 42 on the circuit board. In the circuit shown in FIG. 4, if any of the peripheral signals is connected to the ground end 42 on the circuit board, the host 13 reads the default value directly. If all of the peripheral signals are not connected to ground end 42 on the circuit board, the peripheral component 12 reads the default value stored in memory 11, and then delivers to the host 13. Table 3 and Table 4 are the truth tables of the control unit 35 shown in FIG. 4. Table 3 is the situation that the default value of the peripheral component 12 is stored in the memory 21. Table 4 represents the situation that the default value of the peripheral component 12 is set up by the circuit board.

TABLE 3

|  | reset | $\overline{DF\_set}$ | suspend | $\overline{OE}$ | pull_drv |
|---|---|---|---|---|---|
| Step 1 | 0 | X | X | 1 | 1 |
| Step 2 | 1 | 1 | 0 | 0 | X |
| Step 3 | 1 | 1 | 1 | 1 | 0 |

TABLE 4

|  | reset | $\overline{DF\_set}$ | suspend | $\overline{OE}$ | pull_drv |
|---|---|---|---|---|---|
| Step 1 | 0 | X | X | 1 | 1 |
| Step 4 | 1 | 0 | X | 1 | 0 |

In step 1 of Table 3 and Table 4, after the system resets, a signal reset is enabled, that is logic zero (0). By the transformation of the control unit 35, the signal $\overline{OE}$ will be logic one (1). Because the signal $\overline{OE}$ is connected to the output enable end of three tri-state buffers, the circuit will be in an input mode when the system is reset. In the input mode, the peripheral signal will be connected to an AND gate 41 through three bidirectional buffers 31 and a unidirectional buffer 33. As mentioned above, if the peripheral component has no default value which is set up by the circuit board, the output of the AND gate 41 will be logic one (1). Otherwise, if the peripheral component has a default value which is set up by the circuit board, the output of the AND gate 41 will be logic zero (0). The output of the AND gate is connected to a register, such as a D type flip flop 36 to store, and the output of the register is represented as $\overline{DF\_set}$. If signal $\overline{DF\_set}$ is logic one (1), meaning that the peripheral component does not have a default value, then the peripheral component 12 will read the default value from the memory 11, as shown in Table 3. If $\overline{DF\_set}$ is logic zero (0), then the peripheral component 12 selects one of the default values according to the signal state, as shown in Table 4. In step 2 of the Table 3, when the circuit detects the signal $\overline{DF\_set}$ being logic one (1), meaning all peripheral signals are logic one (1), signal $\overline{OE}$ will be set to logic zero (0), and bidirectional transmission is permitted after the reset signal is disabled. By the characteristic of bidirectional transmission, the peripheral component 12 will generate the corresponding address and control signals to complete the actions of reading the default value in the memory 11. In step 3, if an input signal suspend is logic one (1), representing the peripheral component 12 will go into a power-saving mode. The peripheral component 12 must keep in the state of low current leakage when entering the power-saving mode. For the present invention, after the default value stored in the memory 21 is read, the power-saving mode will reduce the power consumption of the memory 21 by disabling the memory 11. In the power-saving mode of step 3, signal $\overline{OE}$ is turned to logic one (1) which forces the peripheral component 12 into an input mode, and the pull-driving signal pull_drv is turned to logic zero to disable the action of the memory 11.

In step 4 of the Table 4, if the circuit detects signal $\overline{DF\_set}$ being logic zero (0), that means at least one peripheral signal is logic zero (0), then the signal $\overline{OE}$ is set to logic one (1), and a unidirectional path is only permitted. By the characteristic of the unidirectional transmission, the peripheral component 12 can complete the action of reading the default value. In step 4, the signal pull_drv is turned to logic zero (0), and avoids current flowing through the pull resistors 32, whose end is connected to the ground end 42 on the circuit board, thus saving power consumption. In other words, step 4 is a power-saving mode.

In the period of power-on reset shown as the circuit in FIG. 4, because the pull driving signal pull_drv is logic one (1), the signal CS is turned to logic one and therefore enables the memory 11. Meanwhile, the DO output pin of the memory 11 could be logic zero (0) or logic one (1) and thus hard to identify. Therefore, the default values can be selected between binary values 0000 to 1101 to avoid the uncertainty of the DO output signal. Relatively, the circuit structure in FIG. 3 does not have that problem.

Figure 5:
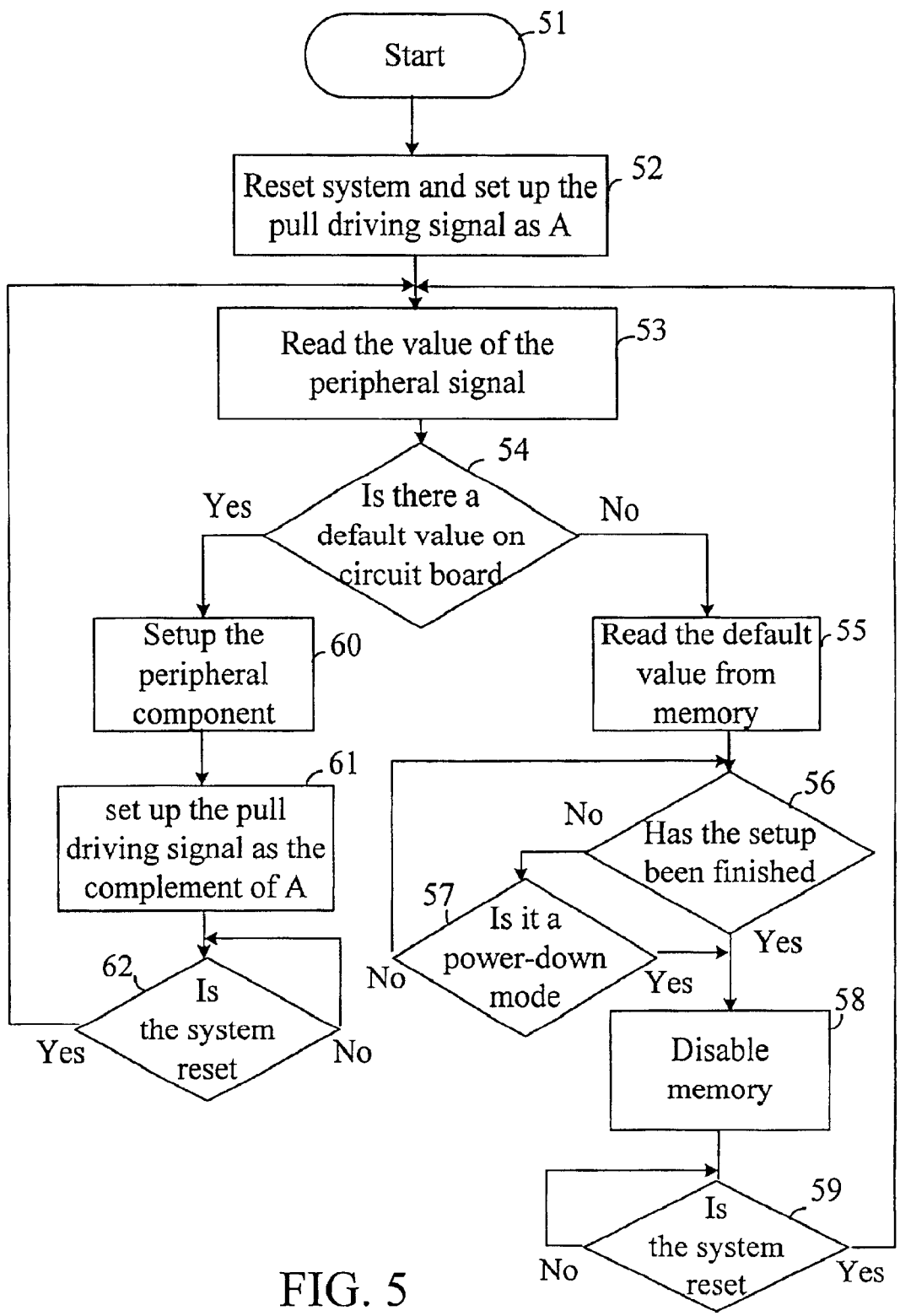
FIG. 5 is a flow diagram of reading default value according to the present invention.

FIG. 5 is a flow diagram of reading default values according to the present invention. In step 51, the present invention starts, wherein the default value of the peripheral component is stored in a memory or set up by the circuit board where the peripheral component is situated. The way that the default value is set up by the circuit board is to connect the peripheral signals to a power end or ground end on the circuit board, and the plurality of the peripheral signal lines are connected to a voltage-controllable point through a plurality of the pull resistors. In step 52, the reset signal of the system is enabled and the pull driving signals are set as A. The enabling reason is caused by a power-on reset, hardware reset or the peripheral component resetting itself. In step 53, the peripheral signals are read. In step 54, the signals having been read are analyzed. If the default value of the peripheral component is set up by connecting the peripheral signals to a power end on the circuit board and none of the peripheral signals having been read is logic one (1) or the default value of the peripheral component is set up by connecting the peripheral signals to a ground end on the circuit board and none of the peripheral signals having been read is logic zero (0), that represents the default value of the peripheral component is not set up by the circuit board. In other words, the default value of the peripheral component is stored in the memory. Otherwise, the values read from the peripheral signal lines are the default value of the peripheral component. If the analyzing result in step 54 is found to contain the default value of the peripheral component stored in the memory, the flow enters step 55. Otherwise, the flow enters step 60. In step 55, the peripheral component sends address and control signals and reads the default value stored in the memory. In step 56, the peripheral component is set up by the value read from the memory. After the set is done, the flow enters step 58. In the setting process of step 56, some special conditions may have occurred. For example, the system entered a power-saving mode or the peripheral component has been disconnected, as shown in step 57. If the special conditions mentioned above have occurred, the peripheral component is forced to enter a power-saving mode, and then the flow enters step 58. In step 58, the memory is disabled to achieve the power-saving effect. The disabling method is to set the voltage-controllable point to logic zero (0), wherein the inverting state of the memory-enabling signal is assumed to be logic zero (0). In step 59, if a reset signal is enabled, the flow enters step 53 and reads the default value again. As mentioned above, if the analyzing result in step 54 is that the default value is set up by the circuit board, the flow enters step 60. In step 60, the peripheral component is set up according to the value read in step 53. In step 61, the pull driving signal is set to the A's complement to achieve the power-saving effect. In step 62, if a reset signal is enabled, the flow enters step 53 and reads the values of the peripheral signals again.

The above-described embodiments of the present invention are intended to be illustrative only. Numerous alternative embodiments may be devised by those skilled in the art without departing from the scope of the following claims.

What is claimed is:

1. An apparatus for reading the default value of a peripheral component, said default value being set up by a power/ground end on a circuit board connected to said peripheral component or being stored in a memory, said apparatus comprising:

a plurality of bi-directional buffers having the ability to determine the direction of data transmissions, said bi-directional buffers having a first end and a second end, said first end connected to said peripheral component, and said second end connected to one of said power/ground end on said circuit board and said memory;

a combinational logic, connected to said first end of the bi-directional buffers for determining if the default value of said peripheral component is set up by the circuit board;

a register for storing the output of said combinational logic;

a control unit, connected to the output of said register and a reset signal and suspend signal on said circuit board for generating a pull driving signal and a control signal to determine the direction of data transmissions of said bidirectional buffers; and a plurality of pull resistors, having a first end and a second end, said first end connected to the second end of said bi-directional buffers, and said second end connected to said pull driving signal of said control unit.

2. The apparatus of claim 1, wherein said register is a D type flip flop.

3. The apparatus of claim 1, wherein if the plurality of pull resistors are connected to said second end of said bi-directional buffers with the way of pulling down, said combinational logic is a NOR gate.

4. The apparatus of claim 1, wherein if the plurality of pull resistors are connected to said second end of said bi-directional buffers with the way of pulling up, said combinational logic is an AND gate.

5. The apparatus of claim 3, wherein if the default value of said peripheral component is stored in said memory and is accessed, the value of the pull driving signal generated by said control unit will be an inverting state of a memory-enabling signal to disable the memory.

6. The apparatus of claim 4, wherein if the default value of said peripheral component is stored in said memory and is accessed, the value of the pull driving signal generated by said control unit will be an inverting state of a memory-enabling signal to disable the memory.

7. The apparatus of claim 1, wherein if said reset signal is enabled, the direction of the data transmissions of said bi-directional buffers is designed as an input mode by the control signals generated by said control unit.

8. The apparatus of claim 1, wherein said peripheral component is a USB device.

9. A method for reading the default value of a peripheral component, said default value being set up by a circuit board or being stored in a memory, the way that said circuit board sets up the default value being to connect a power end of said circuit board to a plurality of I/O signals of said peripheral component, said method comprising the following steps:

(a) after a reset signal is enabled, the plurality of I/O signals being read;

(b) if the values of the plurality of I/O signals are all logic zero (0), it means that said circuit board has not set up the default value of said peripheral component; otherwise, it means that said circuit board has set up the default value of said peripheral component;

(c) in step (b), if said circuit board has not set up the default value of the peripheral component, then the following steps are executed:

(c1) reading the default value of said peripheral component stored in said memory; and (c2) setting up the peripheral component according to the default value; and (d) in step (b), if said circuit board has set up the default value of the peripheral component, then setting up said peripheral component according to the values read in step (a).

10. The method of claim 9, wherein after step (c2), the plurality of I/O signals are connected to an inverting state of a memory-enabling signal through a plurality of pull resistors to disable said memory and therefore save power consumption.

11. The method of claim 9, wherein after step (d), the plurality of I/O signals are connected to complemental voltage levels through a plurality of pull resistors.

12. A method for reading the default value of a peripheral component, said default value being set up by a circuit board or being stored in a memory, the way that said circuit board sets up the default value is to connect a ground end of said circuit board to a plurality of I/O signals of said peripheral component, said method comprising the following steps:

(a) after a reset signal is enabled, the plurality of I/O signals being read;

(b) if the values of the plurality of I/O signals are all logic one (1), it means that said circuit board has not set up the default value of said peripheral component; otherwise, said circuit board has set up the default value of said peripheral component;

(c) in step (b), if said circuit board does not set up the default value of the peripheral component, then the following steps are executed:

(c1) reading the default value of said peripheral component stored in said memory; and (c2) setting up the peripheral component according to the default value; and (d) in step (b), if said circuit board has set up the default value of the peripheral component, then setting up said peripheral component according to the values read in step (a).

13. The method of claim 12, wherein after step (c2), the plurality of I/O signals are connected to an inverting state of a memory-enabling signal through a plurality of pull resistors to disable said memory and therefore save power consumption.

14. The method of claim 12, wherein after step (d), the plurality of I/O signals are connected to complemental voltage levels through a plurality of pull resistors.

* * * * *